W. H. PRATT.
MERCURY METER.
APPLICATION FILED APR. 9, 1908.

993,872.

Patented May 30, 1911.
3 SHEETS—SHEET 1.

Witnesses:

Inventor,
William H. Pratt,
By Att'y.

W. H. PRATT.
MERCURY METER.
APPLICATION FILED APR. 9, 1908.

993,872.

Patented May 30, 1911.

3 SHEETS—SHEET 2.

Witnesses:
Irving E. Steers.
J. Ellis Glen

Inventor,
William H. Pratt,
By Albert G. Davis
Att'y.

W. H. PRATT.
MERCURY METER.
APPLICATION FILED APR. 9, 1908.
993,872.
Patented May 30, 1911.
3 SHEETS—SHEET 3.
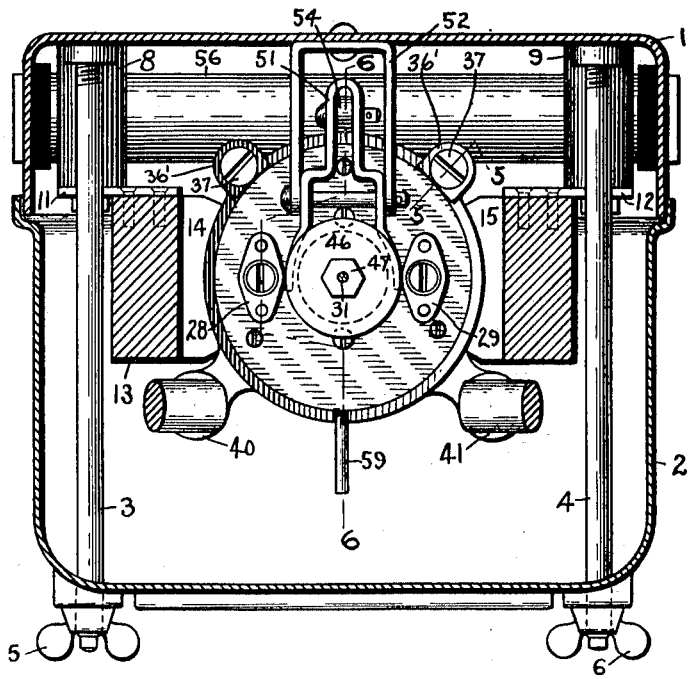
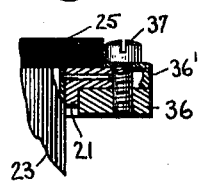
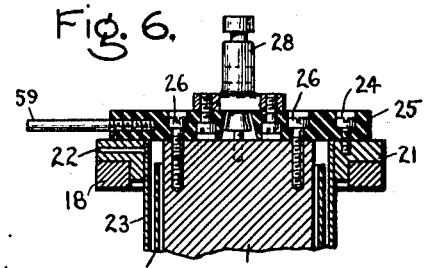
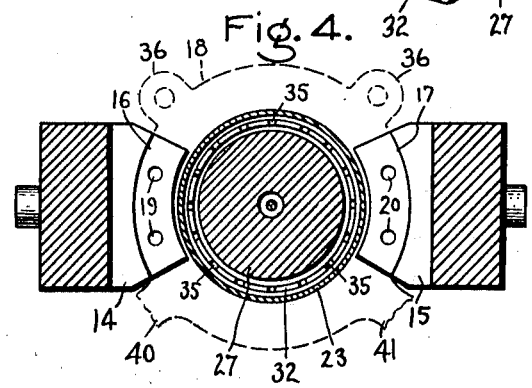
Witnesses
Irving E. Steers.
J. Ellis Glen.
Inventor,
William H. Pratt,
By Albert G. Davis
Att'y.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

MERCURY-METER.

993,872.

Specification of Letters Patent.   Patented May 30, 1911.

Application filed April 9, 1908. Serial No. 426,005.

*To all whom it may concern:*

Be it known that I, WILLIAM H. PRATT, a citizen of the United States, residing at Lynn, in the county of Essex, State of Massachusetts, have invented certain new and useful Improvements in Mercury-Meters, of which the following is a specification.

My invention relates to meters, and more especially to mercury meters, and has for its object improvements in the construction of such meters that will make them reliable in their action and cheaper, which improvements are pointed out more particularly in the appended claims.

For a further understanding of my invention reference may be had to the accompanying drawings, where—

Figure 1:
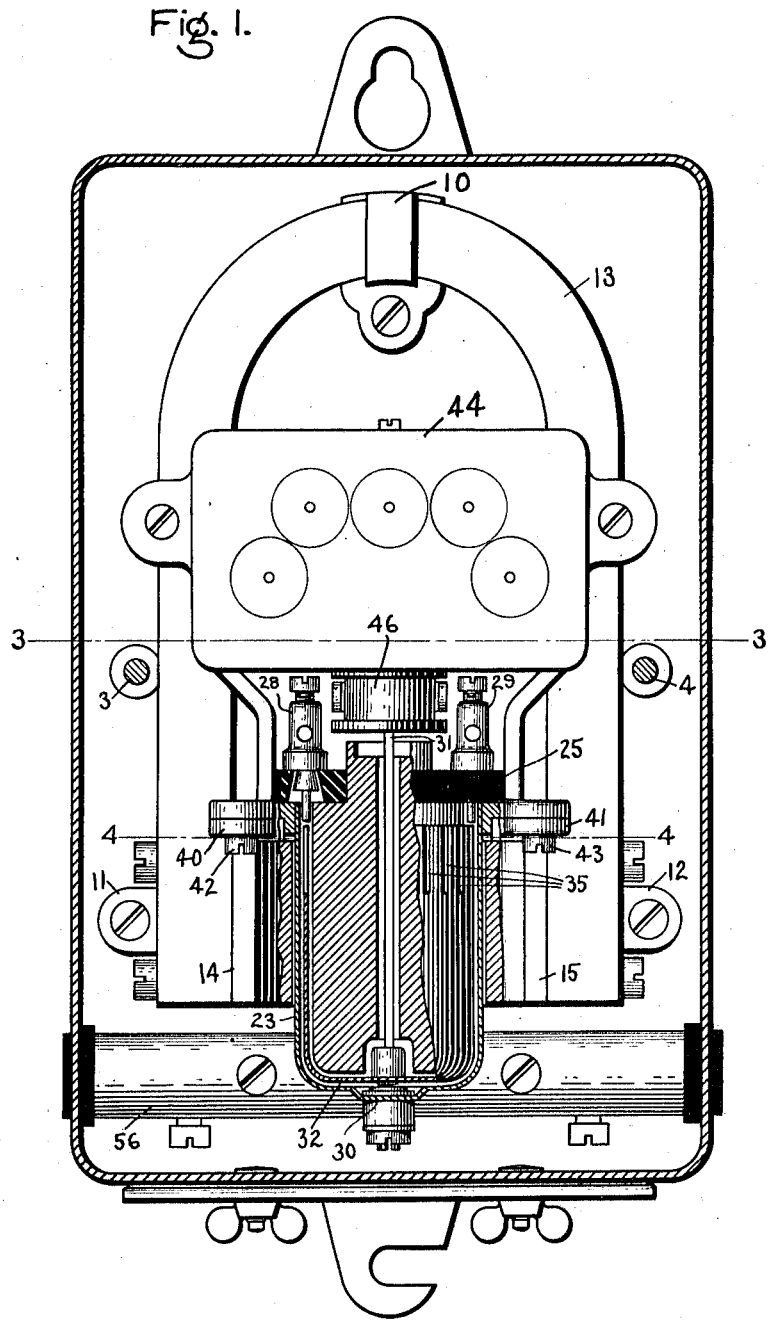
Figure 2:
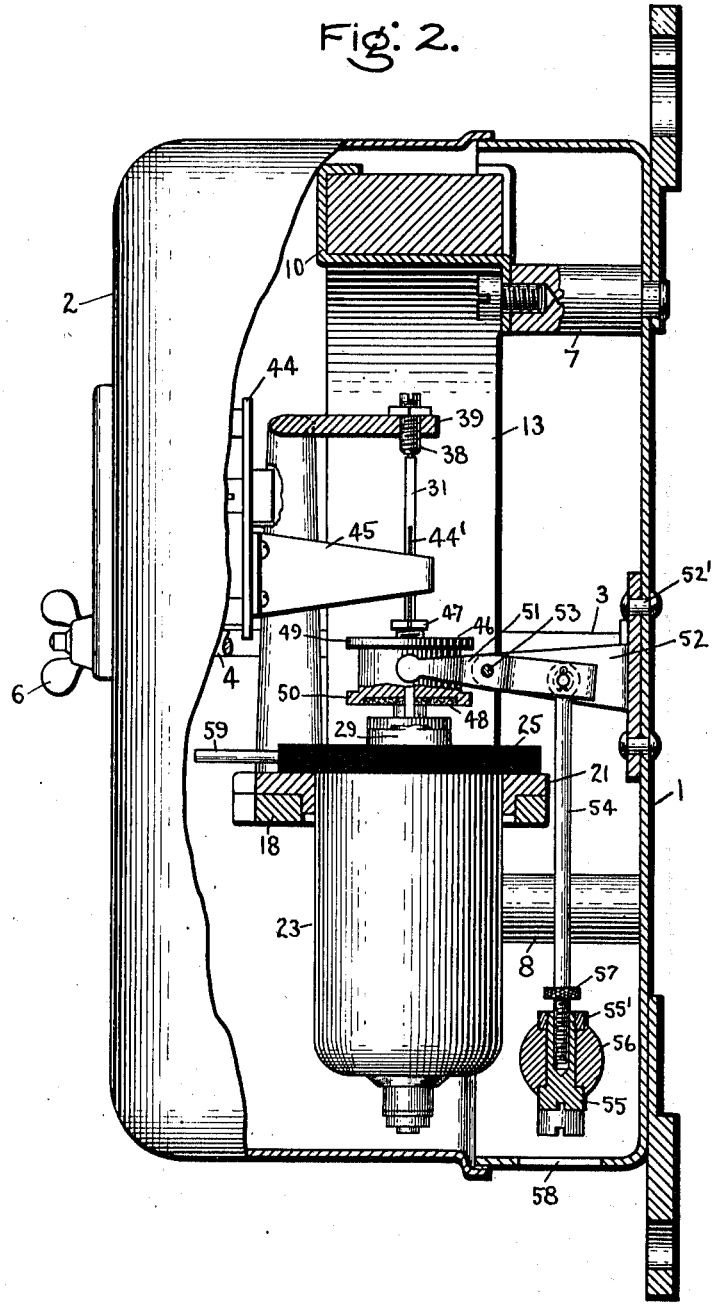

Figure 1 shows a front view of my new meter with the cover removed and portions shown in section, Fig. 2 is a side view of my new meter, with a portion of the cover broken away in order to show better the meter construction and certain portions shown in section, Fig. 3 is a section on line 3 3 of Fig. 1, Fig. 4 is a section on line 4 4 of Fig. 1, Fig. 5 is a section of a detail in construction taken along the line 5 5 in Fig. 3, and Fig. 6 is a section taken along the line 6 6 of Fig. 3.

1 is a base which supports the meter and to which is attached the usual cover 2 by means of studs 3 and 4, which are attached at one end to the base and at the other end have butterfly nuts 5 and 6 coöperating with them to retain the cover in place. Attached to the base are three supports, 7, 8 and 9, to which are attached clips 10, 11 and 12, which support the permanent magnet 13. Secured to either pole of the magnet are pole pieces 14 and 15 shown in Fig. 4, which pole pieces have their interior faces bored out as segments of a cylinder and having their upper faces, 16 and 17, cut away in order to support a ring 18, shown in Fig. 6, and in dotted lines in Fig. 4 that rests upon them. This ring is attached to the pole pieces by suitable screws threading into holes 19 and 20, so that it shall be rigidly attached to the magnet.

Resting upon ring 18 and free to revolve upon it, is a ring or flange 21, which is fastened by rivets 22 to a cup-shaped retaining member 23, which surrounds the meter armature and retains or holds the mercury in which the armature revolves. This retaining member has fastened to it by screws 24 and covering it an insulating member 25, to which is fastened by means of screws 26 a magnetic member 27, which substantially fills the interior of the retaining member, allowing sufficient space between it and the retaining member for the cup-shaped armature 32 to revolve in mercury between them.

Attached to insulating member 25 are binding posts 28, 29, which serve as conductors for leading the current to the meter armature, and which are so placed as to make contact with the mercury surrounding the meter armature at points diametrically opposite and above the armature, as shown in Fig. 1. The retaining member 23 carries a lower bearing 30, upon which bears the lower end of the meter shaft 31. This shaft is attached to the cup-shaped armature 32 in one end (as shown in Fig. 1), so that there shall be very little horizontal play of the armature, and thus it will revolve more uniformly in the mercury-filled space between the retaining member and the magnetic member which substantially fills it. The meter armature has slots 35 cut in its upper edges in order to direct the flow of current.

Referring now to Fig. 5, ring 18 has two lugs 36, into which fit screws 37, holding down L-shaped members 36′, which L-shaped members are in frictional contact with flange 21, so that when screws 37 are screwed down, flange 21 cannot be made to revolve upon ring 18. Rigidly attached to insulating member 25, and hence to the retaining member 23 and member 27 is a handle 59, by means of which these members and the conductors 28 and 29 may be displaced when screws 37 are loosened. The object of this device is to calibrate the meter, for normally conductors 28 and 29 are positioned in a plane parallel to the flux produced between the poles of the magnet, and hence give the maximum torque-producing position for leading the current into the armature. If it is desired to calibrate the meter, or alter its torque, the retaining member with the conductors may be rotated between the poles of the magnet, substantially about the armature axis, and as the position of the plane of the conductors differs from the normal position, so will the meter torque be decreased proportionally.

Meter shaft 31 bears against an upper bearing 38, held by frame 39, which is fastened to lugs 40 and 41 formed on ring 18 by screws 42 43. This frame also carries any well-known form of registering device 44, to which may be attached a member 45 for holding the gear 44', which makes contact with the worm (not shown) on shaft 31 in the well-known manner.

To counter-balance the upward thrust of the mercury upon the meter armature, and also act as a shipping device to prevent the loss of mercury when the meter is transported from one place to another, I employ a weight 46, which surrounds the shaft and normally is held in position by friction against the shaft. This weight has a gasket 48 on its lower face and a stuffing box 47, so that when it is lowered against the upper portion of member 27, shown in Fig. 1, it will make a tight joint with this member and prevent the escape of mercury. Weight 46 has two flanges, 49 and 50, within which play the two arms of a bifurcated lever 51, supported by a member 52 by means of pivot 53, upon which the lever rotates, member 52 being fastened to the base in any suitable manner, such as by rivets 52'. Pivotally attached to the farther end of lever 51 is a rod 54, which is threaded at its lower end so as to thread into a nut 55 movable within a fixed member 56, and having a nut 55' screwed upon its upper end to prevent withdrawal of nut 55 from member 56. Nut 57 is screwed on the lower end of member 54 and acts as a stop when member 54 is in its lowest position. Nut 55 has a slot formed in its lower end, so that a screw driver may be inserted through hole 58 formed for that purpose, in order to rotate the nut 55 and thus move the shipping device up and down.

The operation of my meter is then as follows:—Current is led through the conductors, so as to pass from one edge of the meter armature to the other, thus producing a torque between the armature and the field produced by the magnet, causing the armature to rotate in the well-known manner. If it be desired to alter the calibration of the meter the retaining member surrounding the armature may be revolved, thus displacing the plane of the conductors and altering the meter torque.

If it is desired to ship the meter the nut 55 is turned to the left, which will cause the bifurcated end of the lever partially surrounding the shipping device to move downward and press weight 46 down, so as to make a tight joint with the top of the member filling the interior of the meter armature and surrounding the shaft, and thus prevent the escape of mercury. When it is desired to operate the meter, nut 55 is turned in the reverse direction, thus raising the weight, and after it is raised the desired amount the nut is given a few turns in the first-described direction, thus causing the lever to move out of contact with the weight and prevent any frictional errors from this source.

While I have shown a certain form of construction in which my invention may be carried out, I do not limit myself to this form of construction, but seek in the appended claims to cover those forms and constructions which will be obvious to those skilled in the art, and will be within the scope of my invention.

What I claim as new and desire to secure by Letters Patent of the United States, is—

1. In a mercury meter, a magnet, a cup-shaped armature revoluble in mercury between the poles of the magnet, a magnetic member substantially filling the interior of the armature, conductors leading current to diametrically opposite edges of the armature, and a retaining member rigidly attached to the magnetic member and the conductors and revolubly adjustable about the armature axis.

2. In a mercury meter, a magnet, a cup-shaped armature revoluble in mercury between the poles of the magnet, a magnetic member substantially filling the interior of the armature, conductors leading current to the armature on either side of it in a diametral plane normally parallel to the flux of the magnet, and a retaining member surrounding the armature, rigidly attached to the magnetic member and the conductors, and revolubly adjustable about the armature axis.

3. In a mercury meter, a U-shaped magnet, a cup-shaped armature revoluble in mercury between the poles of the magnet, a magnetic member substantially filling the interior of the armature, an insulating cover attached to the magnetic member and conductors attached to the cover leading current to opposite edges of the armature and displaceable about the meter axis.

4. In a mercury meter, a U-shaped magnet, a cup-shaped armature with longitudinal slots in its edge revoluble in mercury between the poles of the magnet, a magnetic member substantially filling the interior of the armature, conductors leading current to diametrically opposite edges of the armature, rigidly attached to the magnetic member and a non-magnetic retaining member rigidly attached to magnetic member and the conductors and revolubly adjustable about the armature axis.

5. In a mercury meter, a magnet, a cup-shaped armature attached to a shaft near its lower end revoluble in mercury between the poles of the magnet, a lower bearing for the armature shaft, a magnetic member substantially filling the interior of the armature, conductors leading current to opposite edges of the armature, and a retaining member surrounding the armature, rigidly attached to the magnetic member and the conductors, carrying the lower bearing for the armature shaft, and revoluble about the armature axis between the poles of the magnet.

6. In a mercury meter, a U-shaped magnet, a cup-shaped armature revoluble in mercury between the poles of the magnet, a retaining member surrounding the armature revolubly adjustable about the armature axis between the poles of the magnet, means attached to the poles of the magnet for supporting the retaining member, an insulating member covering the retaining member and rigidly fastened thereto, a magnetic member substantially filling the interior of the armature rigidly attached to the insulating member, and conductors rigidly attached to the insulating member leading current to opposite edges of the armature.

7. In a mercury meter, a U-shaped magnet, a cup-shaped armature with slotted edges revoluble in mercury between the poles of the magnet, a shaft attached to the armature near its lower end, a ring attached to upper side of the pole pieces, a non-magnetic retaining member surrounding the armature between the magnet poles revolubly adjustable, a flange attached to the upper edge of the armature resting on the ring, a bearing for the lower end of the meter shaft carried by the retaining member, an insulating cover covering the top of the retaining member rigidly fastened thereto and inclosing the armature, a magnetic member substantially filling the interior of the armature attached to the cover, conductors rigidly attached to the cover making contact with the mercury above diametrically opposite points on the edge of the armature, means for rotating the retaining member with the conductors about an axis substantially the same as the armature axis and means for preventing such rotation.

8. In a mercury meter, a shipping device comprising a weight surrounding the armature, a bifurcated lever partially surrounding the weight and normally out of contact with it, a fixed member, a nut movable within the fixed member, a rod pivotally attached to an end of the lever and threading into the nut for raising and lowering the lever.

In witness whereof, I have hereunto set my hand this sixth day of April, 1908.

WILLIAM H. PRATT.

Witnesses:
JOHN A. MCMANUS, Jr.,
CHARLES A. BARNARD.